United States Patent
Buchmann et al.

(10) Patent No.: US 10,682,820 B2
(45) Date of Patent: Jun. 16, 2020

(54) FIBER COMPOSITE LAMINATE AND METHOD FOR PRODUCING A FIBER COMPOSITE LAMINATE

(71) Applicant: Airbus Defence and Space GmbH, Taufkirchen (DE)

(72) Inventors: Christopher Buchmann, Taufkirchen (DE); Christian Weimer, Taufkirchen (DE); Christoph Meier, Taufkirchen (DE); Jonas Gruenewald, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 16/252,822

(22) Filed: Jan. 21, 2019

(65) Prior Publication Data

US 2019/0152166 A1 May 23, 2019

Related U.S. Application Data

(62) Division of application No. 15/478,298, filed on Apr. 4, 2017, now Pat. No. 10,213,972.

(30) Foreign Application Priority Data

Apr. 14, 2016 (DE) .......... 10 2016 206 325

(51) Int. Cl.
*B29C 70/42* (2006.01)
*B29C 70/40* (2006.01)
(Continued)

(52) U.S. Cl.
CPC ............ *B29C 70/42* (2013.01); *B29B 15/105* (2013.01); *B29C 70/40* (2013.01); *B29C 70/506* (2013.01);
(Continued)

(58) Field of Classification Search
CPC ....... B29B 15/105; B29C 70/40; B29C 70/42; B29C 70/506; B29C 70/086;
(Continued)

(56) References Cited

U.S. PATENT DOCUMENTS

2012/0034833 A1  2/2012  Schaube

FOREIGN PATENT DOCUMENTS

| DE | 102013014111 | 3/2014 |
| DE | 102013002364 | 8/2014 |

(Continued)

OTHER PUBLICATIONS

German Search Report, dated Dec. 15, 2016, priority document.
(Continued)

*Primary Examiner* — Camie S Thompson
(74) *Attorney, Agent, or Firm* — Greer, Burns & Crain, Ltd.

(57) ABSTRACT

A fiber composite laminate having one or more fiber layers, comprising a first laminate region and a second laminate region. In the first laminate region, the fiber layers of the fiber composite laminate are impregnated with a thermoplastic elastomer material. In the second laminate region, fiber layers of a first lamina of the fiber composite laminate are impregnated with the thermoplastic elastomer matrix, and fiber layers of at least one second lamina of the fiber composite laminate that is positioned on top of the first lamina are impregnated with a thermosetting polymer matrix.

12 Claims, 1 Drawing Sheet

(51) Int. Cl.

| | | |
|---|---|---|
| *B29C 70/50* | (2006.01) | |
| *B29B 15/10* | (2006.01) | |
| *B32B 5/14* | (2006.01) | |
| *B32B 3/26* | (2006.01) | |
| *B32B 7/04* | (2019.01) | |
| *B32B 5/08* | (2006.01) | |
| *B32B 27/38* | (2006.01) | |
| *B32B 27/28* | (2006.01) | |
| *B32B 27/36* | (2006.01) | |
| *B32B 27/12* | (2006.01) | |
| *B32B 27/40* | (2006.01) | |
| *B32B 5/26* | (2006.01) | |
| *B32B 27/42* | (2006.01) | |
| *B32B 27/08* | (2006.01) | |
| *B32B 27/20* | (2006.01) | |
| *B29K 101/10* | (2006.01) | |
| *B29K 101/12* | (2006.01) | |
| *B29L 31/30* | (2006.01) | |
| *B29K 21/00* | (2006.01) | |
| *B29K 105/08* | (2006.01) | |
| *B29K 307/04* | (2006.01) | |
| *B29K 309/08* | (2006.01) | |
| *B29L 31/52* | (2006.01) | |

(52) U.S. Cl.
CPC ............... *B32B 3/263* (2013.01); *B32B 5/08* (2013.01); *B32B 5/14* (2013.01); *B32B 5/145* (2013.01); *B32B 5/26* (2013.01); *B32B 7/04* (2013.01); *B32B 27/08* (2013.01); *B32B 27/12* (2013.01); *B32B 27/20* (2013.01); *B32B 27/28* (2013.01); *B32B 27/36* (2013.01); *B32B 27/38* (2013.01); *B32B 27/40* (2013.01); *B32B 27/42* (2013.01); *B29K 2021/003* (2013.01); *B29K 2101/10* (2013.01); *B29K 2101/12* (2013.01); *B29K 2105/08* (2013.01); *B29K 2307/04* (2013.01); *B29K 2309/08* (2013.01); *B29L 2031/3055* (2013.01); *B29L 2031/3091* (2013.01); *B29L 2031/52* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2307/546* (2013.01); *B32B 2307/718* (2013.01); *B32B 2307/7265* (2013.01); *B32B 2307/732* (2013.01); *B32B 2437/02* (2013.01); *B32B 2605/00* (2013.01); *B32B 2605/08* (2013.01); *B32B 2605/10* (2013.01); *B32B 2605/12* (2013.01); *B32B 2605/18* (2013.01)

(58) Field of Classification Search
CPC ............ B29C 70/806; B29K 2021/003; B29K 2101/10; B29K 2101/12; B29K 2105/08; B29K 2307/04; B29K 2309/08; B29L 2031/3055; B29L 2031/3091; B29L 2031/52; B32B 2260/023; B32B 2260/046; B32B 2262/101; B32B 2262/106; B32B 2605/00; B32B 2605/08; B32B 27/08; B32B 27/12; B32B 27/36; B32B 27/38; B32B 27/40; B32B 27/04; B32B 5/08; B32B 5/14; B32B 5/145; B32B 5/26; B32B 7/04; B32B 17/04; A63C 5/122; A63C 11/227; F05C 2253/04; Y02T 50/43; Y10T 428/31504; Y10T 442/2926
USPC .......................................... 428/221; 442/172
See application file for complete search history.

(56) References Cited

FOREIGN PATENT DOCUMENTS

| | | |
|---|---|---|
| EP | 2666617 | 11/2013 |
| GB | 2483730 | 3/2012 |
| WO | WO2006122749 | * 11/2006 |
| WO | 2010118860 | 10/2010 |

OTHER PUBLICATIONS

Dallner, C.; Sandler, J.; Hillebrecht, M. Reul, W.: "Faserverbundkonzept für ein Cabrio-Dachmodul", ATZProduktion, No. 3, Sep. 2012, Springer Vieweg, Springer Fachmedien Wiesbaden GmbH (http://www.plasticsportal.net/wa/plasticsEU~de_DE/function/conversions:/publish/common/upload/technical_journals/automobiles/Fibre_roof.pdf).

* cited by examiner

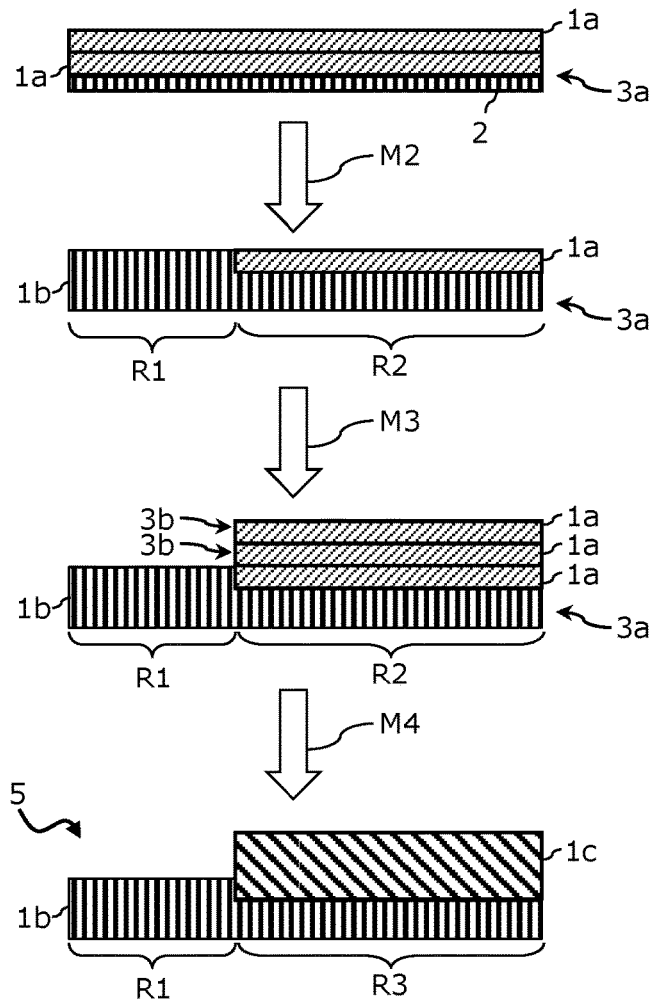
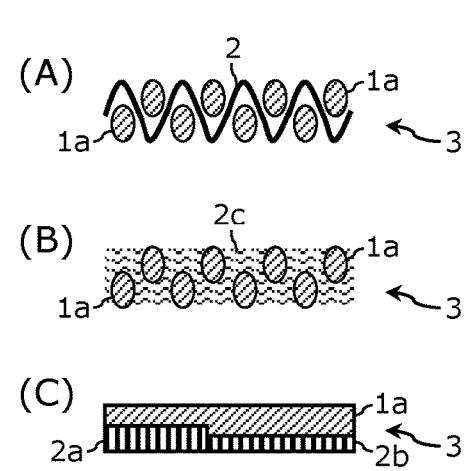
Fig. 2
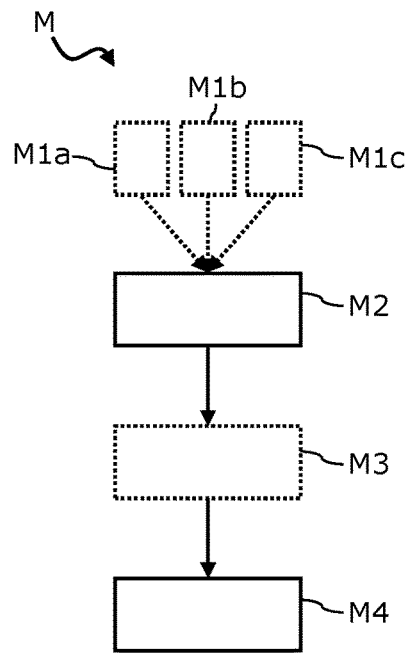
Fig. 3
Fig. 1
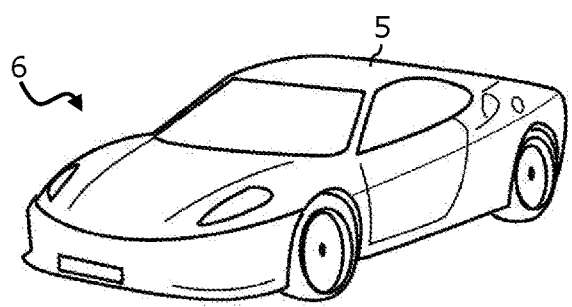
Fig. 4

FIBER COMPOSITE LAMINATE AND METHOD FOR PRODUCING A FIBER COMPOSITE LAMINATE

CROSS-REFERENCES TO RELATED APPLICATIONS

This application is a divisional application of U.S. Ser. No. 15/478,298 filed on Apr. 4, 2017 and claims the benefit of the German patent application No. 102016206325.1 filed on Apr. 14, 2016, the entire disclosures of which are incorporated herein by way of reference.

FIELD OF THE INVENTION

The invention relates to a fiber composite laminate, to a vehicle having a vehicle component which has a fiber composite laminate, to a bicycle having a bicycle component which has a fiber composite laminate, to an item of sports equipment having a sports equipment component which has a fiber composite laminate, and to a method for producing a fiber composite laminate, in particular for use in the production of components having improved material properties, for example, in the field of aviation and aerospace, in car manufacture, in motorcycle manufacture, in bicycle manufacture or in sports equipment production.

BACKGROUND OF THE INVENTION

Components of vehicles that are visible to a user during normal use of the vehicle are referred to as visible components. Visible components of this kind have high requirements in terms of the look and feel thereof because the optical impression that a user looking at the visible component has is often proportional to the supposed or perceived quality of the vehicle. The visible components may be for example interior component parts, such as dashboards, center consoles or control elements, or exterior component parts of a vehicle, such as mud guards, bonnets or vehicle tops. DE 10 2013 014 111 A1 for example discloses a visible component having a transparent and/or translucent cover layer which covers the component. DE 10 2013 002 364 A1 discloses fiber-reinforced visible components for a vehicle, having a reinforcement layer, a cover layer, and an absorption layer between the reinforcement layer and the cover layer.

When fiber-reinforced composites (FRCs) are used as visible components, the layer at the top, which is made of carbon fiber reinforced plastics material, can be opaque. This makes the surface have an optical impression of the individual fibers, and therefore visible components that are reinforced with carbon fibers can also be referred to as carbon visible components having a "carbon look."

EP 2 666 617 A1 discloses a method for producing locally reinforced fiber composite laminates in which a plurality of preforms are stitched together using thermoplastic yarn and then cured all at once. Dallner, C.; Sandler, J.; Hillebrecht, M. Reul, W.: "Faserverbundkonzept für ein Cabrio-Dachmodul," ATZProduktion, no. 3, September 2012, Springer Vieweg, Springer Fachmedien Wiesbaden GmbH (http://www.plasticsportal.net/wa/plasticsEU~de_DE/function/conversions:/publis h/common/upload/technical_journals/automobiles/Fibre_roof.pdf) discloses a convertible roof module consisting of fiber composite sandwich components, which has more potential in terms of light construction than those modules consisting of metal However, there is a need for visible components that have a homogenous surface appearance and, at the same time, can have different mechanical properties in different regions.

SUMMARY OF THE INVENTION

One of the ideas of the invention is that of providing a fiber composite laminate that has locally variable mechanical flexibility and a homogenous surface structure.

According to a first aspect of the invention, a method for producing fiber composite laminates comprises a step of applying pressure and/or heat to a first preform, which has one or more dry fiber layers and a thermoplastic elastomer, such that the thermoplastic portion of the thermoplastic elastomer completely impregnates the dry fiber layers of the first preform in at least one first region and only partially impregnates the dry fiber layers in at least one second region. In a further step, the fiber layers of the second region of the first preform that are still dry and have not been impregnated with the thermoplastic portion of the thermoplastic elastomer are impregnated and cured in a thermosetting polymer matrix.

According to a second aspect of the invention, a fiber composite laminate comprises one or more fiber layers and a first laminate region, in which the fiber layers of the fiber composite laminate are impregnated with a thermoplastic elastomer material, and a second laminate region, in which fiber layers of a first lamina of the fiber composite laminate are impregnated with the thermoplastic elastomer matrix, and fiber layers of at least one second lamina of the fiber composite laminate that is positioned on top of the first layer are impregnated with a thermosetting polymer matrix. In this case, the fiber composite laminate can be a flat laminate, in which the first and the second laminate regions are adjacent along the surface extension of the laminate. In particular, the fiber composite laminate can be a web-like laminate, in which the first and the second laminate regions are adjacent on boundary lines that are perpendicular or substantially perpendicular to the direction in which the web extends.

According to a third aspect of the invention, a vehicle comprises a vehicle component having a fiber composite laminate according to the second aspect of the invention. In some embodiments, the vehicle component can have a visible component, in particular a carbon visible component. In some embodiments, the visible component may include a vehicle top, a dashboard, a control component or a console covering.

According to a fourth aspect of the invention, a bicycle comprises a bicycle component having a fiber composite laminate according to the second aspect of the invention. In some embodiments, the bicycle component may include a bicycle saddle, a frame component, a mudguard or any other component installed on a bicycle.

According to a fifth aspect of the invention, an item of sports equipment comprises a sports equipment component having a fiber composite laminate according to the second aspect of the invention. In some embodiments, the sports equipment component may include a ski boot, a snowboard boot, a ski, a snowboard, a tennis racket, a golf club, a sailing boat or an ice hockey stick.

A basic concept of the invention is that of producing extensive fiber-reinforced laminates having some resilient and some rigid regions. Impregnating the fiber layers of a cover layer semi-finished product with a thermoplastic elastomer to varying extents in the different regions makes it possible to produce a hybrid impregnated region, in which fiber layers of lower laminae are impregnated with a thermoplastic elastomer and fiber layers of laminae positioned on top of the lower laminae are impregnated with a thermoset. Furthermore, the region impregnated with the thermoset can selectively connect further preforms to the laminate in an interlocking manner Laminating additional fiber layers or core structures on top makes it possible to modify the flexural rigidity in a targeted manner in the regions that have only been partially impregnated with the thermoplastic elastomer. In the remaining regions, complete impregnation with the thermoplastic elastomer can result in completely uniform impregnation of the laminate, as well as a high level of flexibility.

Using a common cover layer means that the laminate remains optically homogenous on the whole despite the regions having different levels of flexibility. Furthermore, the fiber layers of the cover layer remain visible on the surface, and therefore it is possible for the component to have a homogeneous carbon look. Furthermore, the use of a common cover layer makes it possible to avoid or at least reduce the number of seam regions in which the cover layer is not integrally formed. This means that the laminate has improved water tightness and thus so too does a component manufactured therefrom.

The continuous fibers of the produced laminate ensure that the component produced therefrom has extremely good mechanical properties. Furthermore, it is possible to produce the laminate in large amounts, for example by continuously pressing the laminate between roller elements, and this reduces manufacturing times and thus reduces the manufacturing costs associated therewith.

According to some embodiments of the method according to the invention, the thermosetting polymer matrix may include epoxy resins, unsaturated polyester resins, vinyl ester resins, phenol formaldehyde resins, diallyl phthalate resins, methacrylate resins, polyurethanes and/or melamine resins. The thermosetting polymer matrix enables the two regions of the laminate to be more flexurally rigid. The thermosetting polymer matrix may only be present in the second regions, and therefore the first regions that are completely impregnated with the thermoplastic elastomer remain relatively flexible. Furthermore, the thermosetting matrix makes it possible to interlockingly connect the fiber layers of the first preform that have not yet been impregnated with the thermoplastic elastomer to dry fiber layers of a second preform that can be laminated on top of the first preform in order to reinforce the second regions.

According to some embodiments of the method according to the invention, the thermoplastic elastomer may include urethane-based thermoplastic elastomers. Thermoplastic elastomers of this kind can be processed in purely physical processes under the effect of heat and mechanical forces such as pressure or shear forces, as a result of which the time period required for processing can be significantly reduced by comparison with chemical processes. This means that processing can be carried out in a cost-effective manner, on a large scale and using mechanical machines that use press rollers, for example.

According to some embodiments of the method according to the invention, the dry fiber layers may comprise carbon fibers or glass fibers. In particular, carbon fibers which are continuous on the front face of the finished laminate can ensure that a component having a laminate of this type has a carbon look.

According to some embodiments of the method according to the invention, the method can also have the step of arranging at least one second preform on the first preform in the second region. In this case, it is possible to impregnate and cure the at least one second preform in the thermosetting polymer matrix at the same time as impregnating and curing the fiber layers of the first preform that are still dry. In some embodiments, the at least one second preform can have dry fiber layers that consist of a fiber material that is different from the fiber material of the dry fiber layers of the first preform. Applying additional fiber layers on top of one or more preforms in a targeted manner makes it possible to locally adjust the thickness of the finished fiber composite laminate and thus the flexural rigidity. The additional preforms can be impregnated with the thermosetting polymer matrix in the same step as when the first preform is impregnated with the thermosetting polymer matrix, as a result of which it is possible for all of the preforms to be interconnected in an interlocking manner in conjunction with impregnation so as to form a uniform laminate.

In this case the fiber material of the second preform can be selected independently of the fiber material of the first preform. This makes it possible, for example, to select the fibers of the second preform according to aspects relating to the mechanical resistance of the fiber composite laminate and to select the fibers of the first preform according to aspects relating to the look of the laminate. The second preforms are applied only on the face remote from the cover layer and are thus not visible on the surface when used in visible components. This allows the surface structure of the laminate to be homogenous on the outer face thereof. The reinforcements that can be made by arranging the second preform(s) on the rear face of the laminate are not visible from the front face. The overall visual optical impression of a component manufactured using the formed laminate is thus improved.

According to some further embodiments of the method according to the invention, the method can also include the step of embedding a thermoplastic elastomer film, as the thermoplastic elastomer, in the dry fiber layers in order to produce the first preform, or embedding the dry fiber layers in a thermoplastic elastomer matrix in order to produce the first preform. By locally varying pressure and/or heat in the step of applying pressure and/or heat to the first preform, the various degrees of impregnation with the thermoplastic elastomer can be controlled.

According to some further embodiments of the method according to the invention, the method can also have the step of laminating the thermoplastic elastomer, as the cover layer, on an upper face of the dry fiber layers in order to produce the first preform. In this case, in some embodiments, the areal weight of the laminated thermoplastic elastomer can be higher in the at least one first region than in the at least one second region. Alternatively or in addition, the lamina thickness of the laminated thermoplastic elastomer can also be selected so as to be higher in the at least one first region than in the at least one second region. When using a uniform processing process, i.e., when the pressure applied, process temperature and/or time for which heat is introduced is uniform, setting different areal weights and/or lamina thicknesses means that the impregnation of the fiber layers can be locally adjusted in the first and second regions. When processing the first preform, a higher areal weight or a higher lamina thickness of the thermoplastic elastomer results in a higher degree of impregnation or a higher impregnation depth of the fiber layers in the first region than in the second region under the same process conditions. This provides for a simpler design of the processing machines, since the impregnation properties of the preform have been previously produced by the material properties of the preform.

According to some embodiments of the fiber composite laminate according to the invention, the laminate can have a larger thickness in the second laminate region than in the first laminate region.

According to some further embodiments of the fiber composite laminate according to the invention, the thermoplastic elastomer film can have urethane-based thermoplastic elastomers.

According to some further embodiments of the fiber composite laminate according to the invention, the fiber layers can comprise carbon fibers or glass fibers.

According to some further embodiments of the fiber composite laminate according to the invention, the thermosetting polymer matrix can include epoxy resins, unsaturated polyester resins, vinyl ester resins, phenol formaldehyde resins, diallyl phthalate resins, methacrylate resins, polyurethanes and/or melamine resins.

According to some further embodiments of the fiber composite laminate according to the invention, fiber layers of the fiber composite laminate in the first laminate region can be a continuation of the fiber layers of the first lamina of the fiber composite laminate in the second laminate region.

The embodiments and developments above can, where appropriate, be combined with one another as desired. Further possible embodiments, developments and implementations of the invention also include not explicitly mentioned combinations of features of the invention described above or in the following with reference to the embodiments. In particular, in this case, a person skilled in the art will also add individual aspects as improvements or additions to the relevant basic form of the present invention.

BRIEF DESCRIPTION OF THE DRAWINGS

In the following, the present invention is described in greater detail by way of the embodiments set out in the schematic drawings, in which:

FIG. 1 is a schematic drawing of semi-finished production phases in a method sequence of a method for producing a fiber composite laminate according to an embodiment of the invention, FIG. 2 is a schematic view of various semi-finished laminates for use as a preform in a method for producing a fiber composite laminate according to an embodiment of the invention, FIG. 3 is a schematic drawing of a method for producing a fiber composite laminate according to a further embodiment of the invention, and FIG. 4 is a schematic view of a vehicle having a vehicle component having a fiber composite laminate according to a further embodiment of the invention.

The accompanying figures are intended to provide further understanding of the embodiments of the invention. They illustrate embodiments and, together with the description, explain principles and concepts of the invention. Other embodiments and many of the mentioned advantages are revealed in the drawings. The elements of the drawings are not necessarily shown true to scale in relation to one another. Terminology indicating directions such as "top," "bottom," "left," "right," "over," "under," "horizontal," "vertical," "front," "rear" and similar specifications are used merely for explanatory purposes and are not used to limit the generality to specific configurations as shown in the drawings.

In the drawings, identical, functionally identical and identically operating elements, features and components have been provided with the same reference signs in each case, unless indicated otherwise.

DETAILED DESCRIPTION OF THE PREFERRED EMBODIMENTS

In the context of the present invention, thermoplastic elastomers include all materials having elastic polymer chains embedded in a thermoplastic matrix material that can be processed in physical processes under the effect of pressure and heat. In the context of the present invention, thermoplastic elastomer films include in particular urethane-based thermoplastic elastomers (TPU), such as Desmopan, Utechllan, Texin, Bonte and Elastollan.

In the context of the present invention, thermosets include all plastics materials that can no longer be deformed once they have been cured, i.e., thermosetting materials that, owing to the high degree of cross-linking thereof, cannot be melted, unlike thermoplastics. In the context of the present invention, thermosets or thermosetting resins include in particular epoxy resins, unsaturated polyester resins, vinyl ester resins, phenol formaldehyde resins, diallyl phthalate resins, methacrylate resins, polyurethanes and melamine resins.

FIG. 1 is a schematic drawing of semi-finished production phases in a method sequence of a method for producing a fiber composite laminate 5. The semi-finished production phases in FIG. 1 are explained in the following, by way of example, in connection with FIGS. 2 and 3.

FIG. 3 is a block diagram of a schematic flow chart of a method M for producing fiber composite laminates, for example components or component parts, as explained in connection with the example intermediate products or semi-finished production phases in FIG. 1. In this case, the method M can be used to produce fiber composite laminates 5 which can, for example, be part of vehicle components which can be used for a vehicle, for example the vehicle 6 shown in FIG. 3, by way of example. For example, vehicle components in which the fiber composite laminate 5 can be used include vehicle tops, tarpaulins or covers for transportation vehicles and transportation trailers, dashboards, control components or console coverings. The vehicle 6 is shown as a passenger car by way of example; however, it should be clear that other vehicles, such as lorries, motorbikes or other types of vehicles can have vehicle components which have fiber composite laminates 5 according to the invention.

Furthermore, the fiber composite laminates according to the invention can also be used in different fields of application. For example, fiber composite laminates having a carbon look, as manufactured according to the method described in this document, can also be used for bicycle components that can be used in the production of bicycles. For example, fiber composite laminates according to the invention can be used in bicycle saddles, frame components, mudguards or similar component parts which have locally variable flexural rigidity. Fiber composite laminates having a carbon look, as manufactured according to the method described in this document, can also be used in sports equipment components that can be used in the production of sports equipment. For example, fiber composite laminates according to the invention can be used in the production of ski boots, snowboard boots, skis, snowboards, tennis rackets, golf clubs, sailing boats or ice hockey sticks. Sports equipment can thus be manufactured so as to have locally variable flexural rigidity and to be aesthetically appealing.

In a first step, a preform 3a is initially provided which has one or more dry fiber layers 1a and a thermoplastic elastomer 2. The preform 3a can be provided in various ways: in addition to the first semi-finished production phase shown in FIG. 1, other semi-finished products can be used as the first preform 3a, as shown by way of example in the variants (A), (B) and (C) of FIG. 2. For example, in an optional step M1a, a thermoplastic elastomer film 2a can be embedded, as the thermoplastic elastomer, in the dry fiber layers 1a in order to produce a preform. A preform 3 of this type is shown by way of example in variant (A) of FIG. 2. In optional step M1c, another option is to embed the dry fiber layers 1a in a thermoplastic elastomer matrix 2c in order to produce a preform. A preform 3 of this type is shown by way of example in variant (B) of FIG. 2. Finally, in optional step M1b, it is also possible to laminate the thermoplastic elastomer 2 as a cover layer on an upper face of the dry fiber layers 1a in order to produce a preform. As shown in FIG. 2(C), a preform of this type can also have different lamina thicknesses 2a and 2b in different regions of the cover layer. In addition or as an alternative to varying the lamina thickness of a laminated elastomer cover layer, the areal weight of the laminated thermoplastic elastomer can be varied either locally or in some regions.

The semi-finished production phase shown at the top of FIG. 1 comprising the first preform 3a can use any one of the preform types 3 shown in FIG. 2. The thermoplastic elastomer is denoted in FIG. 1 by reference sign 2 irrespective of its geometric position and whether it has been embedded or applied in a more general manner. This is the case so as to simplify the depiction, but so as not to create a restriction to particular variants. The thermoplastic elastomers used for this purpose can be urethane-based thermoplastic elastomers (TPU), and the fiber layers 1a can comprise carbon and/or glass fibers.

In a second step M2, heat and/or pressure is then applied to the first preform 3a such that the thermoplastic portion of the thermoplastic elastomer 2 completely impregnates the first preform 3a in at least one first region R1 and only partially impregnates the preform in at least one second region R2. This can be achieved for example by locally varying the pressure and/or heat input. For example, a greater mechanical force may be applied in the first region R1 than in the second region R2. Alternatively or additionally, the temperature may be higher in the second region R2 than in the first region R1 during the impregnation process. The preform 3a may also only be heated from one side (the underside in FIG. 1). Furthermore, the duration for which the pressure and/or increased temperature is maintained in the two regions R1 and R2 can be locally varied. For example, pressure and/or heat may be maintained for a significantly longer time in the first region R1 than in the second region R2. In this case, it is possible to set the pressure and/or heat such that the thermoplastic portion of the thermoplastic elastomer 2 only impregnates the first preform 3a on one side in the at least one second region R2 (the underside of the first preform 3a in the example in FIG. 1).

In an optional third step M3, at least one second preform 3b can be arranged on the first preform 3a in the second region R2. For example, a plurality of second preforms 3b can be stacked one on top of the other on one face of the first preform 3a, on which the fiber layers 1a are not yet impregnated with the thermoplastic elastomer 2 (the upper face of the first preform 3a in the region R2 in the example in FIG. 1).

In some variants, the second preforms 3b can be designed in a similar manner to the first preforms 3a, i.e., the second preforms 3b can have dry fiber layers 1a having thermoplastic elastomer portions 2. As a result, only one processing process has to be carried out for all of the preforms, which saves on manufacturing effort and costs. However, it is also possible to use dry fiber layers 1a for the second preforms 3b that comprise a fiber material that is different from the fiber material of the dry fiber layers 1a of the first preform 3a. Furthermore, the design of the second preforms 3b can, in principle, also be different from that of the first preforms 3a: for example, non-crimp fabrics (NCF), sandwich laminates or core structures can be used as the second preforms 3b. In this case, the second preforms 3b can be selected according to the desired mechanical properties, since the front faces thereof are optically shielded by the fiber layers of the first preform 3a.

As a result of using one or more second preforms 3b, which are arranged on the first preform 3a, the fiber composite laminate 5 has, in the second region R2, a larger local thickness than in the first region R1. The local thickness, and thus the flexibility or flexural rigidity of the second region R2, can be manipulated in a targeted manner with respect to the first regions R1 by the selection of the number and dimensions of the second preforms 3b.

Finally, in a fourth step M4, the second region R2 is impregnated with the first preform 3a and optionally the second preforms 3b in a thermosetting polymer matrix that then interlockingly connects the first and optionally the second preforms 3a, 3b when it cures. The thermosetting polymer matrix may include, for example, epoxy resins, unsaturated polyester resins, vinyl ester resins, phenol formaldehyde resins, diallyl phthalate resins, methacrylate resins, polyurethanes and/or melamine resins. As a result of curing by means of the thermosetting polymer matrix, the second preforms 3b can be laminated on top of the second regions R2, and therefore the flexural rigidity in these regions of the finished fiber composite laminate 5 is locally increased by comparison with the first regions R1. Conversely, in the first regions R1, in which the fiber layers are completely impregnated with the thermoplastic elastomer, the structure remains flexible.

Even when no second preforms 3b are used, the impregnation and curing of the region R2 that is only partially impregnated with the thermoplastic elastomer can result in the formation of a hybrid impregnated region R3, the flexural rigidity of which is higher than the flexural rigidity in the first region R1, which is completely impregnated with the thermoplastic elastomer. In the hybrid impregnated region R3, there are two laminae one on top of the other, the front face lamina 1b shown at the bottom in FIG. 1 is impregnated with the thermoplastic elastomer, and the rear face lamina 1c on top of the front face lamina is impregnated with the thermosetting polymer matrix. This produces a front face lamina 1b in which the fiber layers of the fiber composite laminate 5 extend continuously from the first laminate region R1 into the front face lamina of the second laminate region R2 or of the hybrid impregnated region R3. The fiber composite laminate 5 therefore has a uniformly and homogenously structured surface that does not have any seams.

The method described and the fiber composite laminate produced can be used in general in all branches of the transport industry, for example for road motor vehicles, for rail vehicles, for aircraft or for watercraft, but also in civil engineering and mechanical engineering.

In the detailed description above, various features have been combined in one or more examples in order to improve the conciseness of the explanation. However, it should be clear that the above description is purely for illustrative purposes, but is in no way limiting. It covers all alternatives, modifications and equivalents of the various features and embodiments. Many other examples will be immediately and directly clear to a person skilled in the art reading the above description, on account of his knowledge in the art.

The embodiments have been selected and described in order to be able to set out, in the best possible way, the principles on which the invention is based, and the possible applications thereof in practice. As a result, persons skilled in the art can modify and use the invention and the various embodiments thereof in an optimal manner with regard to the intended use. In the claims and the description, the terms "containing" and "having" are used as neutral terms for the corresponding term "comprising". Furthermore, use of the terms "a", "an" and "one" is not in principle intended to exclude a plurality of such described features and components.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fiber composite laminate comprising:
a first lamina;
a second lamina positioned on top of the first lamina;
a first laminate region, the first laminate region comprising the first lamina wherein a fiber layer of the first lamina is impregnated with a thermoplastic elastomer material in the first laminate region; and
a second laminate region laterally adjacent the first laminate region, the second laminate region comprising the fiber layer of the first lamina impregnated with the thermoplastic elastomer material and a plurality of fiber layers of the second lamina positioned on top of the first lamina wherein the plurality of layers of the second lamina are each impregnated in a thermosetting polymer matrix.

2. The fiber composite laminate of claim 1, wherein the fiber composite laminate is thicker in the second laminate region than in the first laminate region.

3. The fiber composite laminate of claim 1, wherein the thermoplastic elastomer material includes urethane-based thermoplastic elastomers.

4. The fiber composite laminate of claim 1, wherein the plurality of fiber layers comprise at least one of carbon fibers or glass fibers.

5. The fiber composite laminate of claim 1, wherein the thermosetting polymer matrix includes at least one of epoxy resins, unsaturated polyester resins, vinyl ester resins, phenol formaldehyde resins, diallyl phthalate resins, methacrylate resins, polyurethanes or melamine resins.

6. The fiber composite laminate of claim 1, wherein the fiber layers of the fiber composite laminate in the first laminate region are a continuation of the fiber layers of the first lamina of the fiber composite laminate in the second laminate region.

7. A vehicle having a vehicle component incorporating the fiber composite laminate of claim 1.

8. A bicycle having a bicycle component incorporating the fiber composite laminate of claim 1.

9. An item of sports equipment having a sports equipment component incorporating the fiber composite laminate of claim 1.

10. The fiber composite laminate of claim 1, wherein the plurality of fiber layers impregnated in the thermosetting polymer matrix of the second lamina overlaps the first lamina and forms a rear face of the second lamina wherein the rear face of the second lamina in the second laminate region is positioned over a front face of the first lamina in the second laminate region and overlaps only a portion of the front face of the first lamina.

11. The fiber composite laminate of claim 1, wherein a flexural rigidity in the second laminate region of the fiber composite laminate is locally greater than a flexural rigidity of the first laminate region of the fiber reinforced laminate.

12. The fiber composite laminate of claim 1, the fiber layer of the first lamina is fully impregnated with the thermoplastic elastomer material in the first laminate region, and the fiber layer of the first lamina is partially impregnated with the thermoplastic elastomer material in the second laminate region.

* * * * *